United States Patent
Bang et al.

(10) Patent No.: US 10,760,951 B2
(45) Date of Patent: Sep. 1, 2020

(54) WINDOW COVER FOR SENSOR PACKAGE

(71) Applicant: AMOSENSE CO., LTD., Cheonan-si, Chungcheongnam-do (KR)

(72) Inventors: Yeun-Ho Bang, Gwangmyeong-si (KR); In-Tae Yeo, Seoul (KR)

(73) Assignee: AMOSENSE CO., LTD., Chungcheongnam-do (KR)

( * ) Notice: Subject to any disclaimer, the term of this patent is extended or adjusted under 35 U.S.C. 154(b) by 0 days.

(21) Appl. No.: 16/478,040

(22) PCT Filed: Jan. 18, 2018

(86) PCT No.: PCT/KR2018/000828
§ 371 (c)(1),
(2) Date: Jul. 15, 2019

(87) PCT Pub. No.: WO2018/139806
PCT Pub. Date: Aug. 2, 2018

(65) Prior Publication Data
US 2019/0368922 A1    Dec. 5, 2019

(30) Foreign Application Priority Data
Jan. 26, 2017   (KR) .................. 10-2017-0012653

(51) Int. Cl.
*G02B 6/32*       (2006.01)
*G01J 1/04*       (2006.01)
(Continued)

(52) U.S. Cl.
CPC ........... *G01J 1/0214* (2013.01); *G01J 1/0407* (2013.01); *G02B 6/325* (2013.01); *G01D 11/26* (2013.01)

(58) Field of Classification Search
CPC ...... G02B 6/325; G01J 1/0214; G01J 1/0407; G01D 11/26
See application file for complete search history.

(56) References Cited

U.S. PATENT DOCUMENTS 9,465,442 B2 *  10/2016  Rai .................... G06F 3/017
10,211,191 B2 *  2/2019  T'ng .................. G01J 1/0214
(Continued)

FOREIGN PATENT DOCUMENTS

KR    2011-0001987 A    1/2011
KR    2015-0018352 A    2/2015
(Continued)

*Primary Examiner* — Daniel Petkovsek
(74) *Attorney, Agent, or Firm* — Baker & Hostetler LLP (57) ABSTRACT

The proposed technology relates to a window cover for a sensor package, in which a partition wall is provided between a light emitting device and a light receiving device to improve sensing accuracy and reliability of the sensor package. The proposed window cover includes: a base disposed in a direction in which light is emitted from a light source; a light emitting device cover extending from a first surface of the base and disposed at an upper portion of a light emitting device of the sensor package; and a light receiving device cover having the first surface of the base as a bottom surface thereof, and disposed at an upper portion of a light receiving device of the sensor package, wherein an outer circumference of the light emitting device cover extends in a direction opposite to the direction in which the light is emitted to form a partition wall.

12 Claims, 5 Drawing Sheets

(51) Int. Cl.
*G01J 1/02* (2006.01)
*G01D 11/26* (2006.01)

(56) References Cited

U.S. PATENT DOCUMENTS

| | | | | |
|---|---|---|---|---|
| 2007/0210267 A1* | 9/2007 | Ishii | ............ | G01S 17/48 |
| | | | | 250/559.36 |
| 2014/0223734 A1* | 8/2014 | Song | ............ | H01L 24/97 |
| | | | | 29/846 |
| 2015/0041630 A1* | 2/2015 | Heng | ............ | G01S 7/4815 |
| | | | | 250/216 |
| 2015/0279827 A1* | 10/2015 | Tu | ............ | H01L 31/173 |
| | | | | 257/81 |
| 2017/0123101 A1* | 5/2017 | Luan | ............ | G01V 8/12 |

FOREIGN PATENT DOCUMENTS

| | | | | | |
|---|---|---|---|---|---|
| KR | 2015-0033042 | A | 4/2015 | | |
| KR | 2015-0130193 | A | 11/2015 | | |
| KR | 101632112 | B1 | 6/2016 | | |
| KR | 2016-0103487 | A | 9/2016 | | |
| WO | WO-2017099351 | A1 * | 6/2017 | ............ | G01B 11/14 |
| WO | WO-2018230885 | A1 * | 12/2018 | ............ | G01D 5/00 |

\* cited by examiner

FIG. 1

(PRIOR ART)

FIG. 7

WINDOW COVER FOR SENSOR PACKAGE

CROSS REFERENCE TO RELATED APPLICATION(S)

This application is a National Stage of International patent application PCT/KR2018/000828, filed on Jan. 18, 2018, which claims priority to foreign Korean patent application No. KR 10-2017-0012653, filed Jan. 26, 2017, the disclosures of which are incorporated by reference in their entirety.

BACKGROUND OF THE INVENTION

1. Technical Field

The proposed technology relates to a window cover transmitting light from a light source and, more particularly, to a window cover used in a sensor package sensing the amount of light reflected by an object to be sensed.

2. Description of the Related Art

In general, a sensor package senses the amount of light emitted from a sensor and reflected by an object to be sensed and is used as an input apparatus for various applications.

For example, the sensor package senses user's finger movement, and the applications use the information sensed by the sensor package as control information for providing virtual reality (VR) or augmented reality (AR) services.

In addition, the sensor package may be used in various fields such as communication and home appliances, and in the automotive field in internal communication modules, etc.

Figure 1:
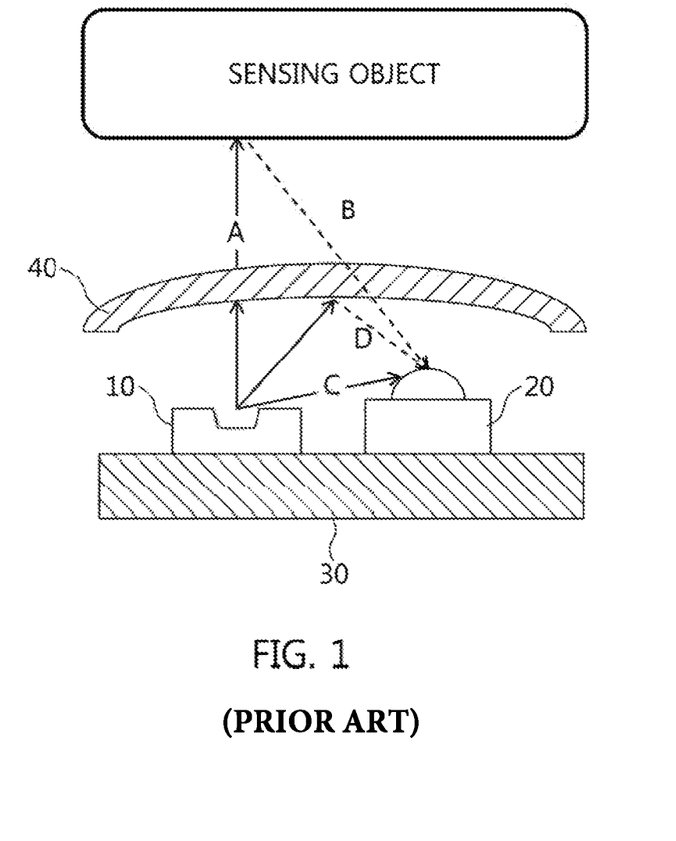
FIG. 1 is a view showing a conventional window cover for a sensor package.

Referring to FIG. 1, the sensor package includes: a printed circuit board 30 in which a light emitting device 10 and a light receiving device 20 are alternately disposed; and a window cover 40 disposed in a direction in which the light emitting device 10 emits light. At this time, the window cover 40 is formed in an arc shape having a predetermined center angle or a flat plate shape.

The light emitting device 10 emits light (A in FIG. 1) in a direction toward the window cover 40. The emitted light passes through the window cover 40 and then is reflected by an object to be sensed.

The light receiving device 20 receives the light (B in FIG. 1) that is reflected by the object to be sensed and which passes through the window cover 40 to sense the amount of the reflected light.

The sensor package generates a sensing valve using the amount of light sensed by the light receiving device 20 and transmits the value to various applications. The applications provide various services such as VR service, AR service, communication service, home appliance control service, and automobile control service by using the sensing value transmitted from the sensor package.

The sensor package has been used for a long distance light emitting device having an irradiation angle of about 30 degrees or less. However, as interest in VR and AR services has increased recently, it is a recent trend to use a short distance light emitting device having an irradiation angle of 60 degrees or more.

However, the sensor package using the short distance light emitting device has a problem in that light (C in FIG. 1) emitted from the light emitting device directly enters the light receiving device, or light (D in FIG. 1) enters the light emitting device because the light is in total internal reflection (or diffused reflection), that is, the light cannot be transmitted through the window cover due to a difference in incidence angle.

In addition, the sensor package senses the amount of light combined with all of light reflected from the object to be sensed, light directly emitted from the light emitting device, and light reflected from the inside of the window cover. Accordingly, a sensing value is generated to be different from a desired result, so that sensing accuracy and reliability are reduced.

In order to solve such the problem, conventionally, a structure for providing a partition wall on a housing in which the sensor package is mounted or the printed circuit board on which elements are mounted has been applied to the sensor package.

The structure for providing the partition wall on the housing or the printed circuit board can block direct incidence of light from the light emitting device to the light receiving device. However, the structure has a problem in that light (that is, the total internal reflection, and the diffused reflection) reflected from the window cover cannot be blocked.

In addition, in the case of the structure for providing the partition wall on the housing or the printed circuit board, light emission of the light emitting device is restricted due to the partition wall, light control is difficult, and mountings of the elements are difficult due to the partition wall.

SUMMARY OF THE INVENTION

The present invention has been made in an effort to solve the problems and an objective of the present invention is to provide a window cover for a sensor package, wherein the window cover is configured such that a partition wall is provided between a light emitting device and a light receiving device to improve sensing accuracy and reliability of the sensor package.

In order to achieve the objects of the present invention, a window cover of the present invention is a window cover installed on a sensor package, the window cover includes: a base disposed by facing a direction in which light is emitted from a light source of the sensor package; a light emitting device cover extending from a first surface of the base in a direction toward the sensor package and disposed at an upper portion of a light emitting device of the sensor package; and a light receiving device cover having the first surface of the base as a bottom surface thereof and disposed at an upper portion of a light receiving device of the sensor package, wherein the light emitting device cover may extend in a direction opposite to the direction, in which the light is emitted from the light source, and forms a partition wall.

The base may have fine unevenness on a second surface thereof, and have an infrared filter on the second surface thereof to transmit infrared light.

The light emitting device cover may have a receiving recess on the first surface thereof adjacent to the light emitting device. The bottom surface of the receiving recess may be formed in a concave shape, and the bottom surface of the receiving recess may be paced apart from the light emitting device at a distance of 500 μm or less.

The partition wall may have a reflective coating layer on an inner surface thereof, and extend further downward than a lower end of a lens of the light receiving device.

A plurality of light emitting device covers may be provided, and outside surfaces of one of the light emitting device covers and of another light emitting device cover may form side surfaces of the light receiving device cover.

A thickness from the bottom surface of the light receiving device cover to the second surface of the base may be 1 mm or less, and a thickness from a bottom surface of the light emitting device cover to the second surface of the base may be formed thicker than a thickness from the bottom surface of the light receiving device cover to the second surface of the base. That is, a separation distance between a bottom surface of the light emitting device cover and the light emitting device may be formed closer than a separation distance between the bottom surface of the light receiving device cover and the light receiving device.

The base, the light emitting device cover, and the light receiving device cover may be formed of one selected from polycarbonate and polymethyl methacrylate.

According to the present invention, the window cover for the sensor package is configured such that the partition wall is integrally formed between the light emitting device and the light receiving device by the light emitting device cover extending from the base, so that it is possible to prevent the light of the light emitting device from directly entering the light receiving device.

Further, by integrally forming the partition wall between the light emitting device and the light receiving device by the light emitting device cover extending from the base, it is possible to simplify the assembly process of the window cover and to realize easy installation of the light emitting device and the light receiving device as compared to that of a conventional window cover using a housing or a separate partition wall.

Further, by providing the reflective coating layer on the inner surface of the light emitting device cover, it is possible to prevent the light of the light emitting device from directly entering the light receiving device.

Further, by providing the fine unevenness on the outer surface of the base, it is possible to minimize incidence of light which is reflected by the inner surface of the window cover (that is, diffused reflection) on the light receiving device. That is, the outer surface of the window cover for the sensor package is formed roughly by forming the fine unevenness, so that an internal reflected light discharge path is formed by using refraction rate difference between the medium and the air, and thus reflected light is discharged through the side portion of the window cover to minimize incidence of reflected light on the light receiving device.

Further, by providing the fine unevenness on the outer surface of the base, it is possible to facilitate the receiving of light reflected by the object to be sensed as compared to the conventional window cover with a smooth surface and to expand the pointing angle of the light emitting device.

Further, by forming the receiving recess provided on the light emitting device in the concave shape, it is possible to increase the extraction amount of light from the light source and to set the pointing angle to be narrow as compared to the structure having a planar receiving recess.

Further, by changing the concave shape of the receiving recess provided on the light emitting device, it is possible to adjust the pointing angle of the sensor package.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an exemplary embodiment of the present invention is described in detail with reference to the accompanying drawings such that the invention can be easily embodied by one of ordinary skill in the art to which this invention belongs. First, when inserting reference numerals into the components in the respective drawings, although the same components are illustrated in the different drawings, they are described to have the same reference numeral as much as possible. Further, in the following description, when it is decided that the detailed description of known function or configuration related to the invention makes the subject matter of the invention unclear, the detailed description is omitted.

Figure 2:
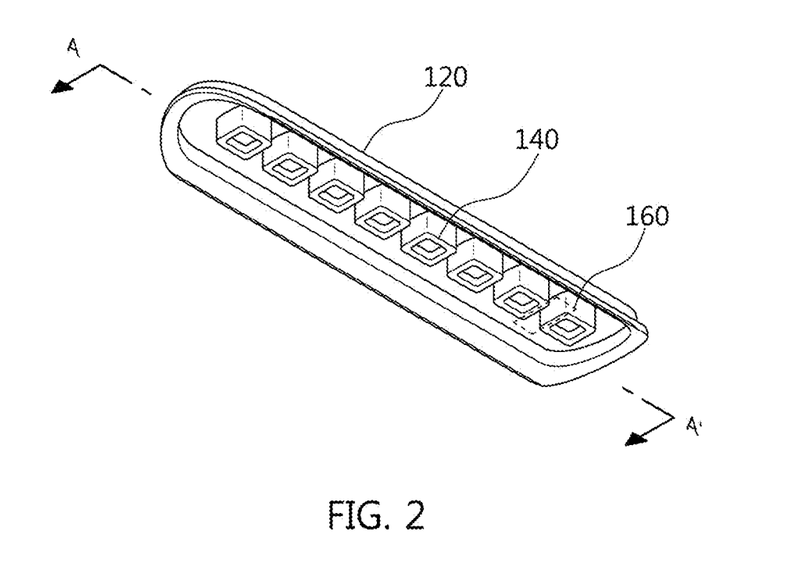
FIG. 2 is a view showing a window cover for a sensor package according to the present invention.
Figure 3:
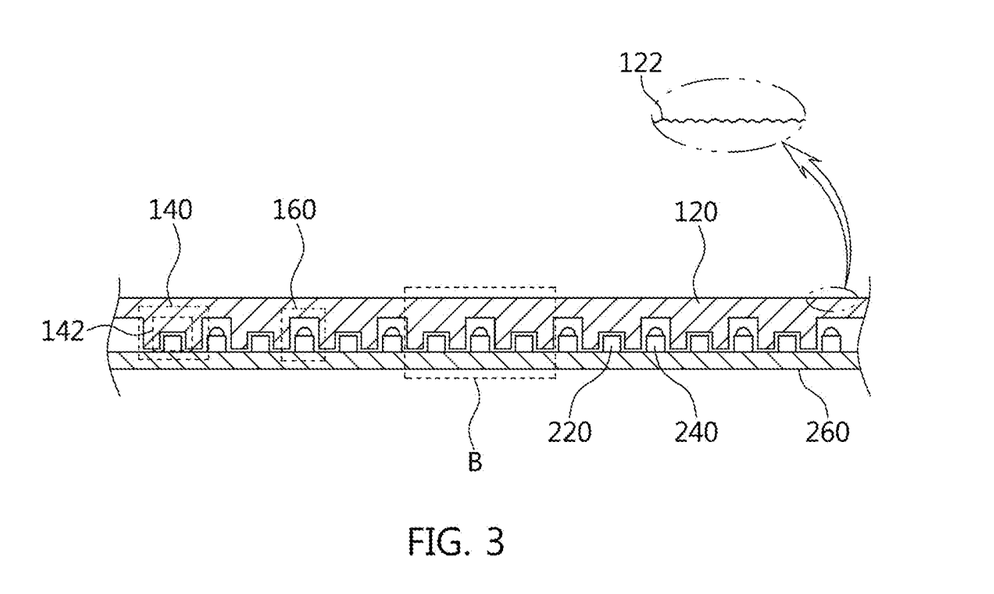
FIG. 3 is a sectional view in which the window cover for the sensor package is cut on the basis of A-A' line of FIG. 2.

Referring to FIGS. 2 and 3, a window cover for a sensor package according to an embodiment of the present invention (hereinafter, the window cover) includes a base 120, a plurality of light emitting device covers 140, and a plurality of light receiving device covers 160. Here, when the base 120 forming the window cover, the light emitting device covers 140, and the light receiving device covers 160 are formed separately, refraction of light from a light source occurs on a boundary surface on which each of configurations (the base 120, the light emitting device covers 140, and the light receiving device covers 160) are combined with each other. The window cover is difficult to be adjusted in an angle when refraction of light from the light source occurs, so the base 120, the light emitting device covers 140, and the light receiving device covers 160 are formed integrally.

The base 120, the light emitting device covers 140, and the light receiving device covers 160 are formed of a light transmitting material capable of transmitting light. For example, the base 120, the light emitting device covers 140, and the light receiving device covers 160 may be formed of light transmissive resin such as polycarbonate and polymethyl methacrylate (PMMA), etc., which have transparency and excellent mechanical strength and are easy to be injected. Here, the base 120, the light emitting device covers 140, and the light receiving device covers 160 are formed of the same material of the light transmissive resin.

Meanwhile, the base 120, the light emitting device covers 140, and the light receiving device covers 160 may be provided to selectively transmit only light at a particular wavelength region. According to the embodiment, the configurations may be formed to transmit light of an infrared light wavelength band.

For example, a pellet may be used in the injection, wherein a dark red color pigment is applied to the pellet so that the light of infrared light wavelength band is efficiently transmitted. This will be described below again.

Figure 4:
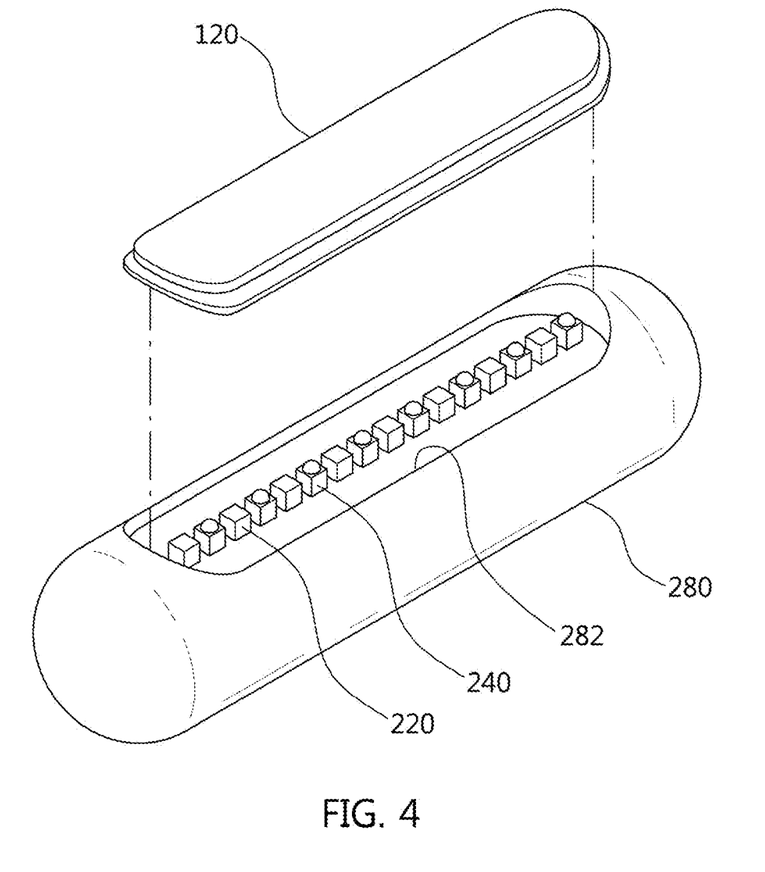
FIG. 4 is a view showing a base in FIG. 2.

Referring to FIG. 4, the base 120 is coupled to a housing 280 of the sensor package. That is, the base 120 is formed in various shapes such as a flat plate shape and a round shape, and is coupled to an opening 282 of the housing 280. Thus, the base 120 is disposed by facing in a direction in which light is emitted from the light source.

The base 120 is provided with a rough outer surface. That is, the base 120 is provided with fine unevenness 122 on the outer surface thereof, thus having the rough outer surface. Here, the fine unevenness 122 of the base 120 is formed by sand treatment, corrosion treatment, embossing treatment, and molding using a fine pattern mold, etc. at the outer surface of the base 120.

The fine unevenness 122 as described above may minimize a scattering rate of the infrared light wavelength internally reflected by the outer surface of the window cover, and provide a function of facilitating incidence of infrared light wavelength reflected by an external object.

For example, in the case of a light emitting device having a pointing angle of about 60 degrees, the window cover is configured to refract light from the light source through the rough surface of the base 120 and transmit the light of the light source with a pointing angle of about 60 degrees to 120 degrees or less, so that the pointing angle of the sensor package can be expanded.

Assuming that a light amount of a light emitting device 220 is 100%, a conventional window cover has an internal reflection amount of about 19% due to diffused reflection caused by an inner surface thereof. It is preferable to minimize the internal reflection amount because it affects accuracy and reliability of the sensor package, but it is difficult to completely eliminate the internal reflection amount.

When the internal reflection amount is about 9% or more of light from the light source of the light emitting device 220, an error is caused in a light receiving device 240. Therefore, the base 120 discharges internal reflected light through a side portion of the window cover to prevent the error of the light receiving device 240 from occurring.

Figure 5:
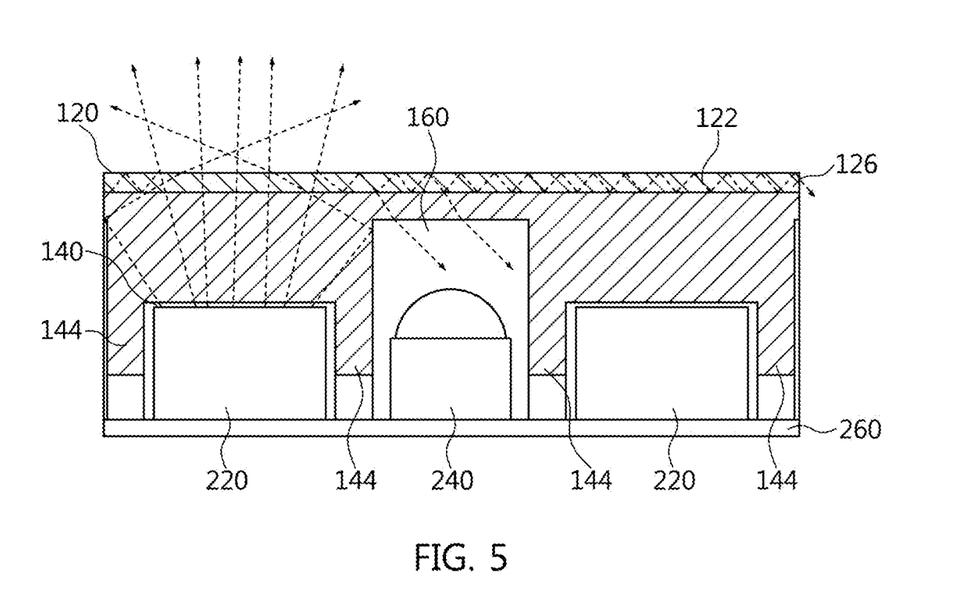
FIG. 5 is a sectional view showing an enlarged portion of an area marked as B in FIG. 3.

To this end, the outer surface of the base 120 is formed roughly to allow the internal reflected light to be discharged in a direction toward the side portion of the window cover. That is, as shown in FIG. 5, by forming the fine unevenness 122 on the outer surface of the base 120, the base 120 forms an internal reflected light discharge path using refraction rate difference between a medium and air, and locks the internal reflected light in the internal reflected light discharge path to discharge the internal reflected light through the side portion of the window cover.

Here, when the light emitting device 220 adopts the infrared light as the light from the light source, the outer surface of the base 120 is formed of an infrared filter 126 transmitting the infrared light, and the infrared filter 126 has the fine unevenness 122 on a surface thereof, so that the base 120 can form the internal reflected light discharge path.

Accordingly, the window cover discharges about 91% of the internal reflected light amount through the side surface of the base, thereby reducing the internal reflected light amount to about 1.7% or less of the light amount of the light emitting device 220.

Each of light emitting device covers 140 protrudes from a first surface of the base 120, and each of light receiving device covers 160 is formed by a separation space between one of the light emitting device covers 140 and another light emitting device cover 140.

The light emitting device cover 140 is formed by protruding downwardly from an inner surface of the base 120, and when the window cover and the housing 280 are coupled with each other, the light emitting device cover 140 is disposed at an upper portion of the light emitting device 220 mounted in the housing 280. Here, the light emitting device cover 140 has a receiving recess 142 on a first surface thereof adjacent to the light emitting device 220.

The receiving recess 142 is configured to receive a part of the light emitting device 220 when the window cover and the housing 280 are coupled with each other. That is, when the window cover and the housing 280 are coupled with each other, the upper portion of the light emitting device 220 is closely disposed at a bottom surface of the receiving recess 142.

Here, when the window cover and the housing 280 are coupled with each other, and the bottom surface of the receiving recess 142 and the light emitting device 220 are directly in contact with each other so that an air gap is not formed therebetween, light output efficiency of the light emitting device 220 is maximized.

However, when the light emitting device cover 140 is manufactured so as to be in contact with the light emitting device 220, it is possible that problems such as a poor-quality assembly of the window cover and the housing 280 are caused due to assembly tolerance, damage to the light emitting device 220, change of pointing angle, and decrease of light emitting performance.

Accordingly, the light emitting device cover 140 is configured to have a separation distance of 500 μm or less from the upper portion of the light emitting device 220 to form the air gap. That is, the separation between the bottom surface of the receiving recess 142 provided in the light emitting device cover 140 and the light emitting device 220 is about 500 μm or less.

Figure 6:
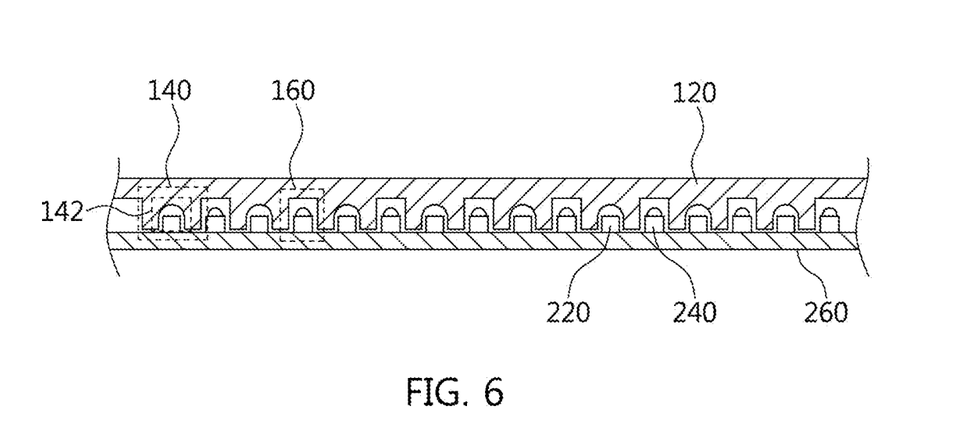
FIG. 6 is a view showing a light emitting device cover and a light receiving device cover in FIG. 2.

Referring to FIG. 6, the bottom surface of the receiving recess 142 may be formed in a concave shape. When the bottom surface of the receiving recess 142 is formed in the concave shape, the pointing angle of the sensor package is reduced, thereby concentrating light, and increasing the light emitting amount (that is, the light extraction amount). Here, the concave shape of the receiving recess 142 may be varied to adjust the pointing angle of the light from the light source.

An outer circumference of the light emitting device cover 140 (that is, an outer circumference of the receiving recess 142) extends further downward than the bottom surface of the receiving recess 142 to form a partition wall 144. Here, the partition wall 144 prevents the light from the light source of the light emitting device 220 from being directly received by an adjacent light receiving device 240.

When the partition wall 144 is provided closer to a surface (that is, a printed circuit board 260), the partition wall 144 may maximize an effect of blocking direct light receiving.

However, since the partition wall 144 is actually formed in a thinness of about several μm, when length thereof is increased, problems such as curvature and breaking occur.

Therefore, the partition wall 144 is configured such that a lowest end thereof is positioned lower than a lower end of a lens of the light receiving device 240. That is, the partition wall 144 is formed such that the lowest end thereof extends further downward than the lower end of the lens of the light receiving device 240.

In addition, as shown in FIG. 5, the partition wall 144 may be disposed to be spaced apart from the printed circuit board 260 at a predetermined distance. It is preferable that the partition wall 144 is provided closest to the printed circuit board 260, but when a length of the partition wall 144 extends to be in contact with the printed circuit board 260, poor-quality of assembly may occur when tolerance is generated in the length of the partition wall 144 during the assembly process.

The partition wall 144 is formed of the same material as the light emitting device cover 140. Therefore, the light from the light source of the light emitting device 220 may be transmitted through the partition wall and then enter the light receiving device 240.

Figure 7:
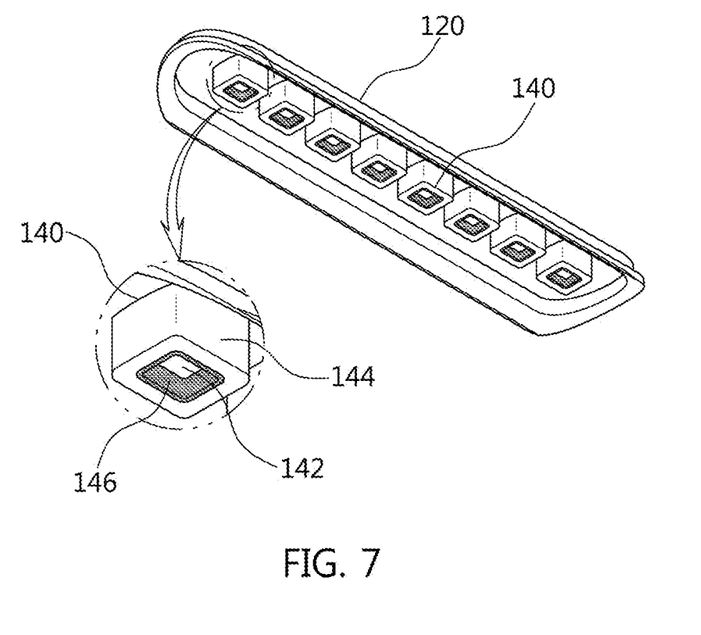
FIG. 7 is a view showing the light emitting device cover in FIG. 2.

Thus, as shown in FIG. 7, the receiving recess 142 may have a reflective coating layer 146 so as to prevent the light from directly entering the light receiving device 240. That is, since the reflective coating layer 146 is provided on an inner surface of the receiving recess 142 to reflect the light irradiated to the light receiving device 240, thereby preventing the light from the light emitting device 220 from being directly received by the light receiving device 240.

The reflective coating layer 146 may be provided on the inner surface of a side surface (that is, the partition wall 144) of the receiving recess 142, and be formed by transmit reflector (TR) coating. In FIG. 7, it is shown that the reflective coating layer 146 is provided on all inner side surfaces of the receiving recess 142, but the reflective coating layer 146 may be provided on only inner side surfaces adjacent to the light receiving device 240.

The light receiving device cover 160 is configured of the first surface of the base 120 as a bottom surface thereof, and two outer surfaces of the adjacent light emitting device covers 140 as side surfaces thereof. Here, when the window cover and the housing 280 are coupled with each other, the light receiving device cover 160 is disposed at an upper portion of the light receiving device 240 mounted in the housing 280.

The light receiving device cover 160 is configured such that a thickness of the bottom surface thereof is formed equal to or less than a predetermined thickness so that light reflected by an object to be sensed easily enters the light receiving device 240. That is, when the thickness of the bottom surface of the light receiving device cover 160 is higher than the predetermined thickness, the light amount entering the light receiving device 240 is reduced due to refraction of the reflected light (for example, diffused reflection), and sensing accuracy and reliability of the sensing package are reduced.

Accordingly, the bottom surface of the light receiving device cover 160 is formed to have the thickness equal to or less than the predetermined thickness (for example, about 1 mm). In other words, the thickness from the bottom surface of the light receiving device cover 160 to a second surface of the base 120 is about 1 mm or less.

The light emitting device cover 140 is formed to have a different thickness (that is, a thickness of a bottom surface of the light emitting device cover 140) from the light receiving device cover 160. That is, the light emitting device cover 140 is thickly formed so as to be close to the light emitting device 220, and the light receiving device cover 160 is thinly formed so as to increase light transmission ratio. Here, thicknesses of bottom surfaces of the light emitting device cover 140 and the light receiving device cover 160 include a thickness of the base 120.

Therefore, the window cover is configured such that the thickness thereof at the upper portion of the light emitting device 220 is thicker than the thickness thereof at the upper portion of the light receiving device 240.

Although exemplary embodiments of the present invention were described above, it should be understood that the present invention may be changed and modified in various ways by those skilled in the art without departing from the spirit and scope of the present invention described in the following claims.

What is claimed is:

1. A window cover installed on a sensor package, the window cover comprising:
    a base disposed by facing a direction in which light is emitted from a light emitting device of the sensor package;
    a light emitting device cover extending from a first surface of the base in a direction toward the sensor package and disposed at an upper portion of a light emitting device of the sensor package; and
    a light receiving device cover having the first surface of the base as a bottom surface thereof and disposed at an upper portion of a light receiving device of the sensor package,
    wherein an outer circumference of the light emitting device cover extends toward a printed circuit board of the sensor package to form a partition wall,
    wherein the partition wall is disposed to be spaced apart from the printed circuit board,
    wherein the base, the light emitting device cover and the light receiving device cover are formed integrally,
    wherein the base has fine unevenness on a second surface thereof.

2. The window cover of claim 1, wherein the base has an infrared filter on the second surface thereof to transmit infrared light.

3. The window cover of claim 1, wherein the light emitting device cover has a receiving recess on the first surface thereof adjacent to the light emitting device.

4. The window cover of claim 3, wherein the bottom surface of the receiving recess is formed in a concave shape.

5. The window cover of claim 3, wherein the bottom surface of the receiving recess is paced apart from the light emitting device at a distance of 500 um or less.

6. The window cover of claim 1, wherein the partition wall has a reflective coating layer on an inner surface thereof.

7. The window cover of claim 1, wherein the partition wall extends further downward than a lower end of a lens of the light receiving device.

8. The window cover of claim 1, wherein a plurality of light emitting device covers comprising the light emitting device cover is provided, and outside surfaces of one of the light emitting device covers and of another light emitting device cover form side surfaces of the light receiving device cover.

9. The window cover of claim 1, wherein a thickness from the bottom surface of the light receiving device cover to a second surface of the base is 1 mm or less.

10. The window cover of claim 1, wherein a thickness from a bottom surface of the light emitting device cover to a second surface of the base is formed thicker than a thickness from the bottom surface of the light receiving device cover to the second surface of the base.

11. The window cover of claim 1, wherein a separation distance between a bottom surface of the light emitting device cover and the light emitting device is formed closer than a separation distance between the bottom surface of the light receiving device cover and the light receiving device.

12. The window cover of claim 1, wherein the base, the light emitting device cover, and the light receiving device cover are formed of one selected from polycarbonate and polymethyl methacrylate.

* * * * *